United States Patent
Hirsbrunner et al.

(10) Patent No.: US 10,045,312 B2
(45) Date of Patent: Aug. 7, 2018

(54) METHOD AND APPARATUS FOR CONTROLLING HIGH POWER TRANSMISSION

(71) Applicant: Nokia Technologies Oy, Espoo (FI)

(72) Inventors: Alex Hirsbrunner, Bloomingdale, IL (US); Akila Srinivasan, Carpentersville, IL (US); Tarun Agarwal, Palatine, IL (US); William Gayde, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/236,216

(22) Filed: Aug. 12, 2016

(65) Prior Publication Data

US 2018/0049140 A1 Feb. 15, 2018

(51) Int. Cl.
| | |
|---|---|
| H04Q 7/20 | (2006.01) |
| H04W 52/32 | (2009.01) |
| H04W 8/18 | (2009.01) |
| H04L 12/26 | (2006.01) |
| H04W 88/08 | (2009.01) |
| H04W 88/02 | (2009.01) |

(52) U.S. Cl.
CPC ........... *H04W 52/32* (2013.01); *H04L 43/16* (2013.01); *H04W 8/186* (2013.01); *H04W 88/02* (2013.01); *H04W 88/08* (2013.01)

(58) Field of Classification Search
CPC ....... H04W 48/02; H04W 48/16; H04W 4/08; H04W 84/045
USPC ........ 455/418, 422.1, 442, 436, 434, 456.4, 455/435.1, 450, 411, 452.1, 559; 380/270; 370/328, 329, 310, 352; 714/758; 709/217, 226; 726/3, 6, 4; 713/168, 156

See application file for complete search history.

(56) References Cited

U.S. PATENT DOCUMENTS

| | | | | |
|---|---|---|---|---|
| 7,873,015 | B2 * | 1/2011 | Gallagher | H04W 8/065 370/338 |
| 9,282,461 | B2 * | 3/2016 | Rinne | H04W 16/14 |
| 9,826,101 | B2 * | 11/2017 | Schmidt | H04M 15/46 |
| 2006/0080671 | A1 * | 4/2006 | Day | G06F 13/387 719/314 |
| 2006/0206709 | A1 * | 9/2006 | Labrou | G06Q 20/18 713/167 |
| 2009/0150669 | A1 * | 6/2009 | Jeong | H04N 7/1675 713/168 |
| 2009/0305699 | A1 * | 12/2009 | Deshpande | H04W 48/16 455/434 |

(Continued)

OTHER PUBLICATIONS

"Report and Order and Second Further Notice of Proposed Rulemaking", Federal Communications Commission, FCC 15-47, Apr. 21, 2015, pp. 1-187.

(Continued)

*Primary Examiner* — Tan H Trinh
(74) *Attorney, Agent, or Firm* — Squire Patton Boggs (US) LLP (57) ABSTRACT

In accordance with an example embodiment of the present invention, methods, apparatae and software products are presented for enabling transmission by devices requiring a priori and periodic authorization from a spectrum access server for transmission.

21 Claims, 7 Drawing Sheets

(56) References Cited

U.S. PATENT DOCUMENTS

| | | | |
|---|---|---|---|
| 2010/0056132 A1* | 3/2010 | Gallagher | H04W 24/02 455/422.1 |
| 2010/0069067 A1* | 3/2010 | Vanderveen | H04L 63/0823 455/435.1 |
| 2010/0070760 A1* | 3/2010 | Vanderveen | H04L 63/0823 713/156 |
| 2010/0110945 A1* | 5/2010 | Koskela | H04W 48/20 370/310 |
| 2010/0153816 A1* | 6/2010 | Li | H04L 1/0061 714/758 |
| 2010/0190498 A1* | 7/2010 | Ha | H04W 60/00 455/435.1 |
| 2010/0203865 A1* | 8/2010 | Horn | H04W 48/16 455/411 |
| 2010/0223659 A1* | 9/2010 | Ekl | H04W 12/06 726/4 |
| 2010/0323679 A1* | 12/2010 | Yang | H04W 48/02 455/418 |
| 2011/0143756 A1* | 6/2011 | Gallagher | H04W 36/14 455/435.1 |
| 2011/0171915 A1* | 7/2011 | Gomes | H04W 24/10 455/73 |
| 2012/0120887 A1* | 5/2012 | Deaton | H04W 16/14 370/329 |
| 2012/0150998 A1* | 6/2012 | Wang | H04W 4/08 709/217 |
| 2013/0150042 A1* | 6/2013 | Oh | H04W 36/0061 455/436 |
| 2014/0068079 A1* | 3/2014 | Kumar | H04W 72/0453 709/226 |
| 2014/0213259 A1* | 7/2014 | Teyeb | H04W 48/16 455/436 |
| 2014/0237547 A1* | 8/2014 | Bose | H04W 16/14 726/3 |
| 2014/0357285 A1* | 12/2014 | Smith | H04W 48/17 455/450 |
| 2015/0163671 A1* | 6/2015 | Stanforth | H04W 16/14 455/411 |
| 2015/0223077 A1* | 8/2015 | Fan | H04W 16/14 370/312 |
| 2015/0245374 A1* | 8/2015 | Mitola | G06Q 30/08 370/329 |
| 2015/0282147 A1* | 10/2015 | Schmidt | H04W 12/08 455/411 |
| 2015/0312781 A1* | 10/2015 | Chowdhary | H04W 24/04 455/424 |
| 2015/0358968 A1* | 12/2015 | Malladi | H04W 16/14 455/454 |
| 2015/0373554 A1* | 12/2015 | Freda | H04W 16/14 455/450 |
| 2015/0382199 A1* | 12/2015 | Sun | H04W 16/14 455/447 |
| 2016/0212624 A1* | 7/2016 | Mueck | G06F 17/30545 |
| 2016/0227385 A1* | 8/2016 | Ahmad | H04L 65/4061 |
| 2016/0262024 A1* | 9/2016 | Freda | H04W 16/14 |
| 2016/0295510 A1* | 10/2016 | Zisimopoulos | H04W 24/02 |
| 2016/0338096 A1* | 11/2016 | Vajapeyam | H04L 1/1861 |
| 2016/0366655 A1* | 12/2016 | Schmidt | H04W 16/14 |
| 2017/0013468 A1* | 1/2017 | Zhu | H04L 41/12 |
| 2017/0041801 A1* | 2/2017 | Liu | H04W 16/10 |
| 2017/0181001 A1* | 6/2017 | Smith | H04W 16/14 |
| 2017/0188241 A1* | 6/2017 | Mueck | H04W 16/14 |
| 2017/0188314 A1* | 6/2017 | Mueck | H04W 52/243 |
| 2017/0208454 A1* | 7/2017 | Knisely | H04W 8/22 |
| 2017/0208474 A1* | 7/2017 | Mody | H04W 16/14 |
| 2017/0208476 A1* | 7/2017 | Khambekar | H04W 16/14 |
| 2017/0238136 A1* | 8/2017 | Smith | H04W 4/023 455/456.3 |
| 2017/0311167 A1* | 10/2017 | Sun | H04W 16/10 |
| 2017/0346853 A1* | 11/2017 | Wyatt | H04L 43/12 |

OTHER PUBLICATIONS

"Further Notice of Proposed Rulemaking", Federal Communications Commission, FCC 14-49, Apr. 23, 2014, pp 1-90.

"Citizens Broadband Radio Service", Electronic Code of Federal Regulations, Aug. 5, 2016, pp. 1-27.

"3rd Generation Partnership Project; Technical Specification Group Radio Access Network; Mobility procedures for Home Node B (HNB); Overall description; Stage 2 (Release 13)", 3GPP TS 25.367, V13.0.0, Dec. 2015, pp. 1-14.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.2.0, Jun. 2016, pp. 1-623.

* cited by examiner

PRIOR ART

METHOD AND APPARATUS FOR CONTROLLING HIGH POWER TRANSMISSION

TECHNICAL FIELD

The present application relates generally to controlling transmission of a user equipment in compliance with authorization of a spectrum access server.

BACKGROUND

In an effort to make more effective use of available spectrum, the Federal Communication Commission (FCC) has specified in 47 CFR I.D, Part 96 rules (hence forth referred to as Rules) for operation of non-primary devices controlled by a spectrum access server (SAS), the socalled Citizens Broadband Radio Service (CBRS). The Rules generally describe that an intentional transmitter must seek authorization from a SAS prior to transmission. User equipments (UEs), also termed End User Devices (EUDs) connectable to an authorized intentional transmitter are generally excluded from this authorization requirement, provided that their maximum effective isotropic radiated power (EIRP) does not exceed 23 dBm/10 MHz.

Figure 1:
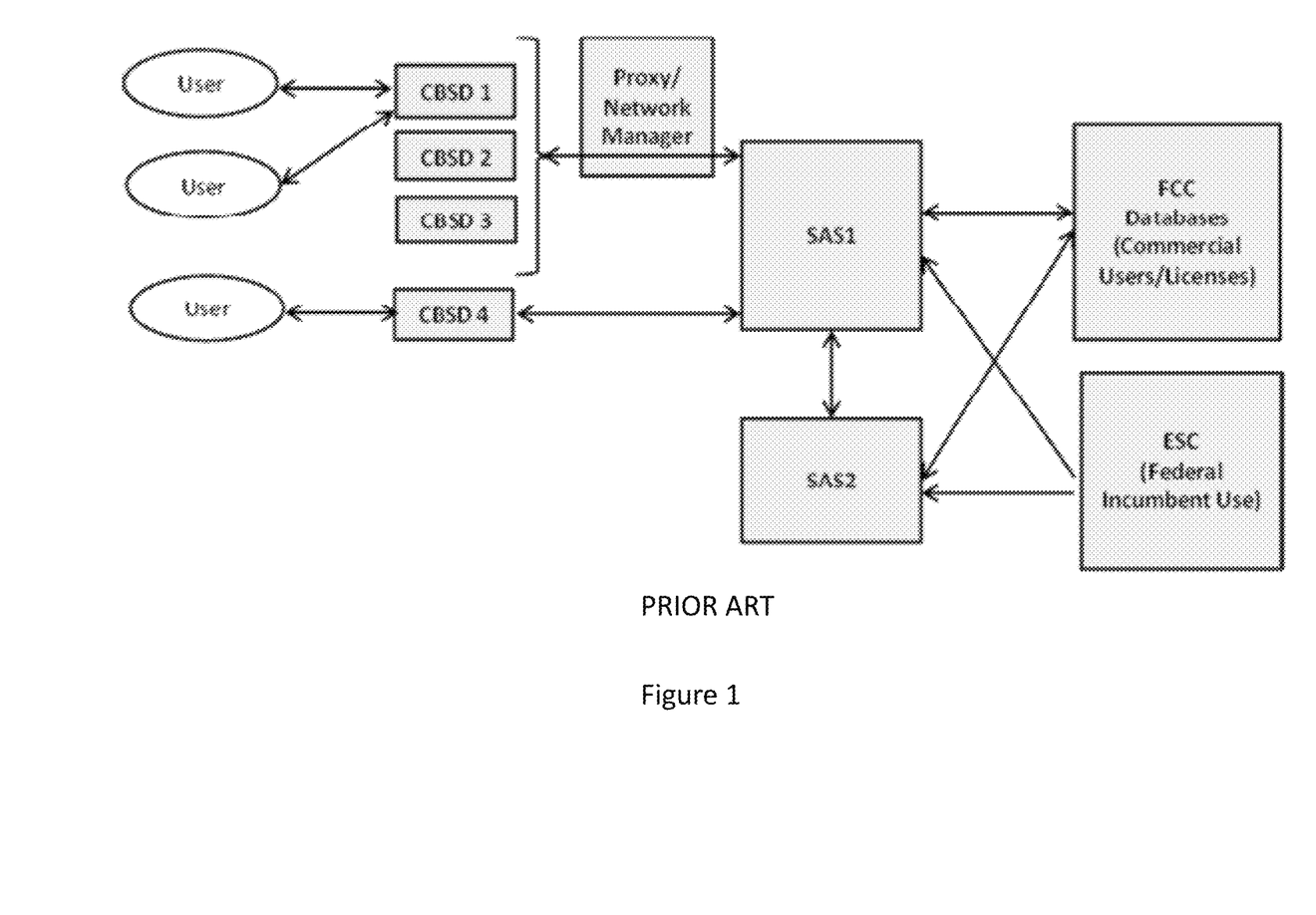
FIG. 1 illustrates a system in accordance with the prior art.

FIG. 1, adopted from the Report and Order and Second Further Notice of Proposed Rulemaking, GN Docket No. 12-354, released Apr. 21, 2015, generally captures a system in accordance with the Rules, wherein Citizens Broadband Radio Service Devices (CBSD 1-4) are under control of a SAS, directly or through a proxy and UEs "User" are not.

Closed Subscriber Groups are generally defined to provide a limited set of users with connectivity access to a cell, barring other users access to the cell. Users attempting to access such a cell will generally be rejected by reason of not being allowed to roam to the cell (see e.g. 3GPP TS 25.367 or 3GPP TS 36.331)

SUMMARY

Various aspects of examples of the invention are set out in the claims.

According to a first aspect of the present invention, there is disclosed an apparatus caused at least to request from a SAS authorization whether a UE not comprised in the apparatus is authorized to transmit; receive from the SAS an indication whether or not the UE is authorized to transmit; and allow a base station to broadcast a CSG identifier uniquely associated with the UE at least in dependence of the indication.

According to a second aspect of the present invention, there is disclosed an apparatus caused at least to refrain from any transmission until reception of a CSG identifier uniquely associated with the apparatus; subsequent to reception of the CSG identifier, allow transmission by the apparatus substantially until the CSG identifier has not been received for at least a predetermined period.

According to a third aspect of the present invention, receive an indication allowing transmission of a CSG identifier uniquely associated with a UE; transmit the CSG identifier periodically at least until occurrence of an event comprising at least one of: a reception of an indication not allowing transmission of the CSG identifier; and an absence of a periodic indication allowing transmission of the CSG identifier; and in response to occurrence of the event, terminate periodic transmission of the CSG identifier within a predetermined time period

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

In rural deployment, it is foreseen that a maximum EIRP of 23 dBm/10 MHz for UEs is inadequate to provide access, let alone reliable and fast access. A need hence exists to deploy, compliant with the Rules, socalled Rural Category B CBSDs as UEs, allowing a maximum EIRP of 47 dBm/10 MHz. Such UEs however require authorization by a SAS prior to transmission, which such UEs cannot obtain by requesting authorization as they are not allowed to transmit such requests over the air interface. Including another interface, e.g. a satellite connection, merely for that purpose is generally not economic. The present invention seeks to overcome this problem.

Figure 2:
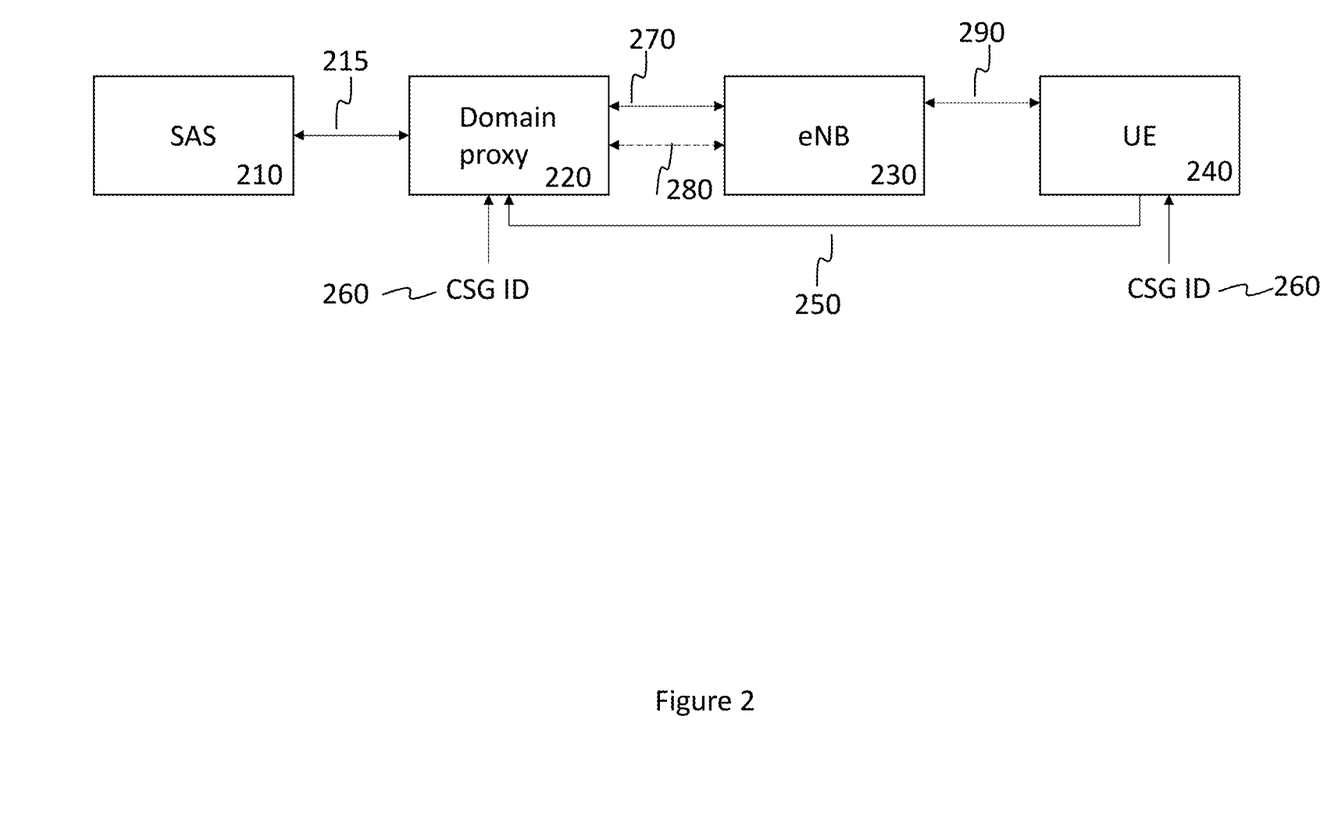
FIG. 2 illustrates a system in accordance with the present invention.

FIG. 2 depicts a system in accordance with the invention. A SAS 210 is connected through link 215 to a domain proxy 220 which in turn is connected to an enhanced Node B (eNB) 230 through link 280. One skilled in the art will appreciate that an eNB can generally be any type of base station, access point or access node. Also a base station may be understood to cover any type of eNB, Node B, access point or access node. The eNB 230 is itself generally under authorization of the SAS. One skilled in the art will appreciate that the domain proxy 220 can be a separate device from the eNB, a co-located device with the eNB or its functionality can be integrated in the eNB without departing from the scope of the invention. A domain proxy may serve multiple eNBs. An eNB may serve a plurality of UEs both of high power and non-high power variety. For example, when deployed in a village, the eNB may serve non-high power UE, which do not require SAS authorization, deployed in the village and service high power UEs, which do require SAS authorization, deployed on the surrounding farms. In the proceeding, reference to UEs generally refers to high power UEs, unless explicitly stated otherwise.

UE 240 is generally professionally installed remotely from eNB 230. Due to lack of authorization, it is initially not allowed to transmit, but is allowed to receive. An installer should compile a data set describing the UE and its installation. The data set comprises FCC identification number, call sign, user contact information, air interface technology, unique manufacturer's serial number, sensing capabilities (if supported), antenna gain, beamwidth, azimuth, downtilt angle, and antenna height above ground level, outdoor/indoor installation, device class, or at least any data required for an authorization request. In addition, the UE is configured with a closed subscriber group (CSG) identifier 260 that is unique to the UE within the scope of the eNB. The data set may be stored at least in part in the UE by the installer or may at least in part be preconfigured prior to field deployment. In the later case, the installer may need to verify that the preconfiguration reflects the actual installation in order to certify the installation. The data set, excluding the CSG identifier, may also at least in part be transferred by the domain proxy to the UE once a connection between the eNB and the UE has been established. For example a WiFi, Bluetooth or wired interface may be used to locally access the UE. The same data set, including the CSG identifier, or at least information sufficient for determining the CSG identifier is stored in the domain proxy by process 250. It may be stored subsequent to the installation or prior to the installation. In the later case, confirmation of installation certification may be required before the data set may be used. An installer may for example convey the data set to the domain proxy through a portable satellite connection while onsite at the UE, through a connection of another, currently SAS authorized, UE, or may upload the data set remotely from the UE, for example from the installer's office before the field deployment or after the field deployment is completed.

In any case, at least the domain proxy 220 should be brought into possession of a data set required for an authorization request for the UE and information indicative of a CSG identifier 260 uniquely associated with the UE, while the UE should at least be brought into possession of the CSG identifier 260. In a preferred embodiment, the CSG identifier and/or at least a portion of the data set is stored in non-volatile memory in the UE. FIGS. 3-6 assume this to be effectuated prior to the described signaling.

Figure 3:
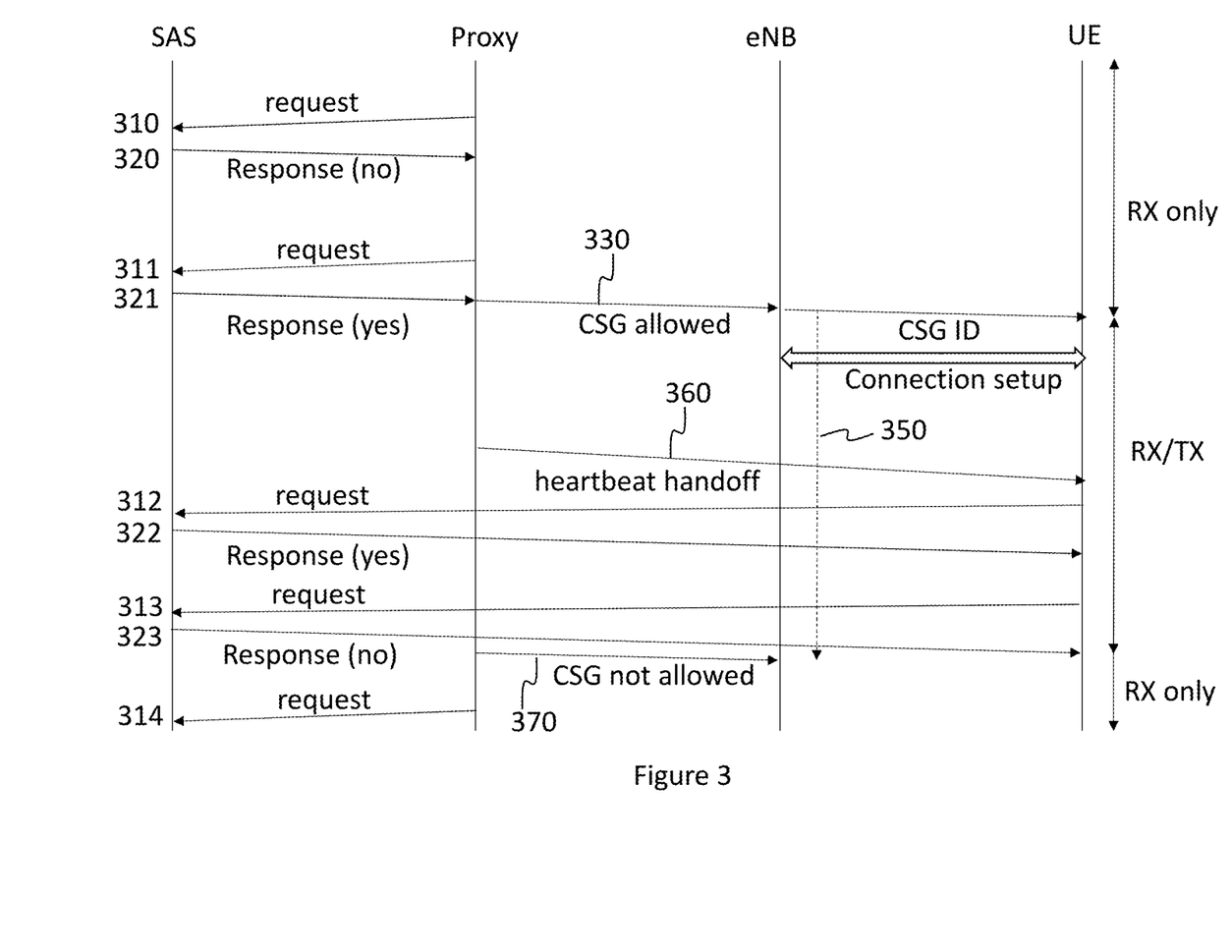
FIG. 3 illustrates a signaling in accordance with the present invention.

FIG. 3 describes an embodiment of the invention. A domain proxy sends a request to SAS, wherein the request comprises a data set associated with a UE's configuration and installation. The domain proxy may receive from the SAS a response indicating whether the UE is allowed to transmit, the response typically further comprising at least one allowed channel to transmit on and at least a maximum power level. As indicated at 320, the SAS may deny the authorization of the UE. The domain proxy will, generally periodically, repeat the request, e.g. 311, until a positive authorization response 321 is received. In response to the positive authorization response 321, the domain proxy signals the eNB at 330 that it is allowed to start transmitting a CSG identifier uniquely associated with the UE. One may appreciate that the CSG identifier itself may be included in signal 330 or that the signal may merely identify the UE, where the eNB performs a mapping of the identified UE to its unique CSG identifier.

In response to the signal 330 allowing the CSG identifier to be transmitted, the eNB may start transmitting the CSG identifier, for example in a System Information Block (SIB) of type 4 such as specified in 3GPP TS 36.331. Typically, the CSG identifier transmission is broadcast substantially periodic as depicted by 350. The eNB may transmit the CSG identifier over all cells comprised in the eNB.

The UE, which is monitoring at least one channel but is not allowed to transmit, receives the CSG identifier and interprets this as being a SAS authorization signal. In response, the UE initiates connection setup with the eNB, the completion of which may be informed to the domain proxy.

In some embodiments, the eNB may configure the UE with the address of the domain proxy to allow the UE to request handover of the control of periodically renewing the authorization from the SAS. In other embodiments, the eNB may route such handover requests addressed to a predetermined address to the domain proxy. The address of the domain proxy may also be configured in the UE at the time of installation. In yet other embodiments, the domain proxy initiates the handover of the control of periodically renewing the authorization from the SAS. Through any of these embodiments, the domain proxy may transfer at 360 the control of periodically renewing the authorization from the SAS to the UE. In some embodiments, the transfer may include transfer of at least a part of the configuration and installation data set to the UE.

Having completed the transfer 360, the UE initiates periodically renewing (312, 313) the authorization from the SAS until either a response 323 explicitly deauthorizes the UE, the eNB no longer broadcasts the CSG identifier uniquely associated with the UE (periodic broadcast, for example in accordance with a predetermined LTE SIB 4 periodicity, of which is depicted by 350), for example determined by a timer since last reception of the CSG identifier, or until the eNB ceases operation. Upon any of these events, the UE ceases transmission. Since a UE is generally permitted 60 seconds to cease transmission, the UE may delay up to this amount of time to cease transmission in response to any of these events. Naturally, there may be other reasons for the UE to cease operation, such as power cycling. For the purpose of periodically renewing the authorization (312, 313, 322, 323), an end-to-end security context may be maintained between the SAS and the UE. Alternatively, separate security contexts may be maintained for the SAS-to-proxy link and the proxy-to-UE link, with the domain proxy generally acting as relay. The proxy-to-UE link traverses the eNB as shown in FIG. 2 at 270 and 290

One skilled in the art will appreciate, that the UE may for example determine the eNB to no longer broadcast the CSG identifier after failing to detect the signal potentially comprising the CSG identifier over multiple periods of periodic transmission of the CSG identifier and at the first occurrence of the signal potentially comprising the CSG identifier being successfully determined not to comprise the CSG identifier.

Once the UE ceases transmission for any reason, which may be explicitly signaled by the UE to at least one of the eNB or the domain proxy, or detected by the eNB or domain proxy from the content of the signaling or absence of signaling, the domain proxy reassumes at 314 control over periodically renewing the authorization from the SAS for the UE. The domain proxy may indicate at 370 either explicitly or implicitly to the eNB that the eNB is no longer allowed to transmit the CSG identifier uniquely associated with the UE.

In some embodiments, an indication that the eNB is not allowed to transmit the CSG identifier may be explicitly transmitted, such as for example at 370. In some embodiments, an indication that the eNB is not allowed to transmit the CSG identifier may be explicitly transmitted, such as for example in response to reception of response 320.

Figure 4:
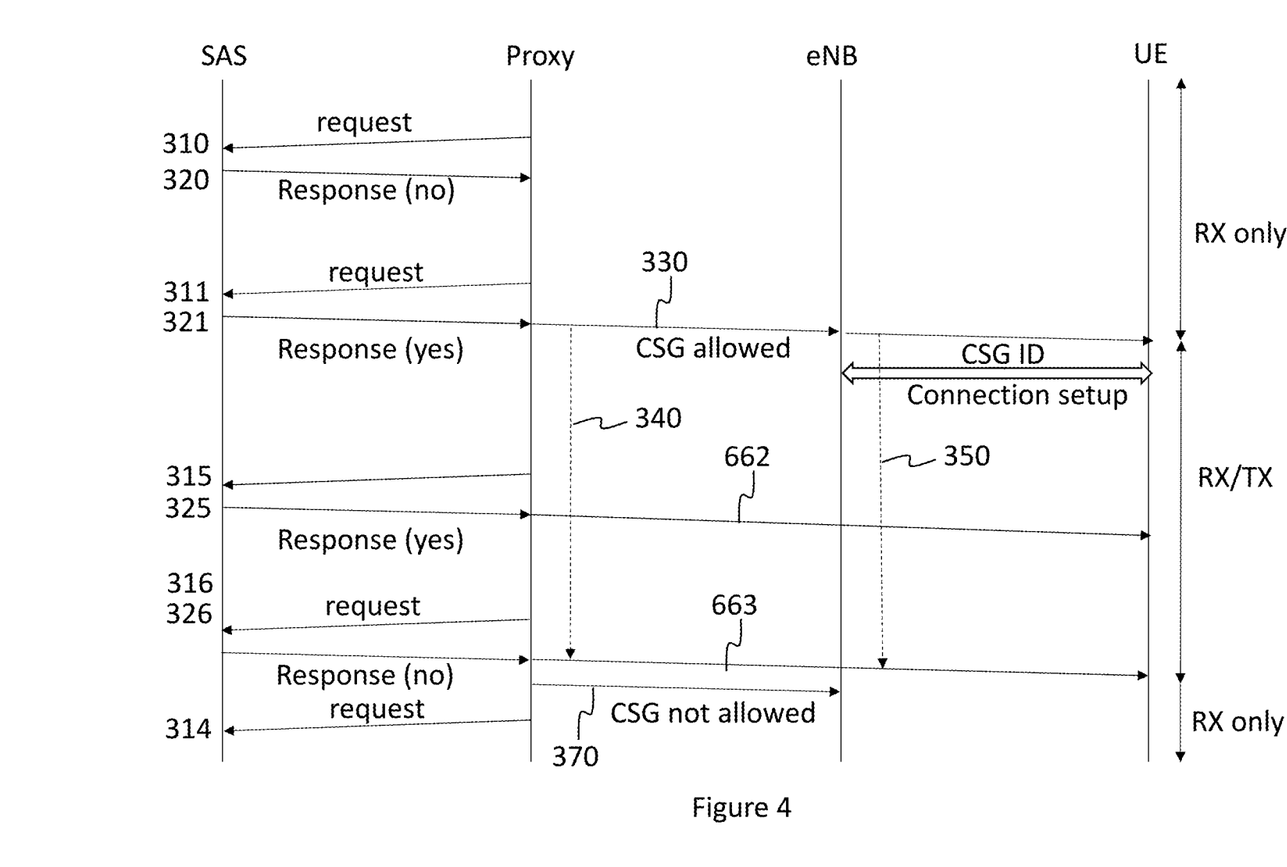
FIG. 4 illustrates another signaling in accordance with the present invention.

FIG. 4 depicts another embodiment according to the invention. In this embodiment, instead of facilitating a transfer of control of the periodic authorization from the SAS from the domain proxy to the UE, the proxy remains in control of the periodic authorization 315, 316 and forwards at 662, 663 responses 325, 326 from the SAS to the UE. The UE will then be able to determine from the forwarded responses whether it is remains authorized, without having to initiate the requests. One skilled in the art will understand that the UE may be able to request the current authorization status from the domain proxy, for example if a loss of authorization is impending or a periodic forwarded response has not been received.

The domain proxy may maintain separate security contexts for the SAS-to-proxy link and the proxy-to-UE link. The proxy may use the responses received from the SAS to indicate, periodically as depicted by 340 or otherwise, whether the eNB is allowed to transmit the CSG identifier, which the eNB is generally not able to extract from forwarded responses 662, 663 due to their encryption.

In some embodiments, the domain proxy may modify the response 325 from the SAS before forwarding to the UE. This may for example be used to remove channels authorized by the SAS that are not used by the eNB. In general, the proxy domain may narrow the authorization received from the SAS, but not broaden it.

Figure 5:
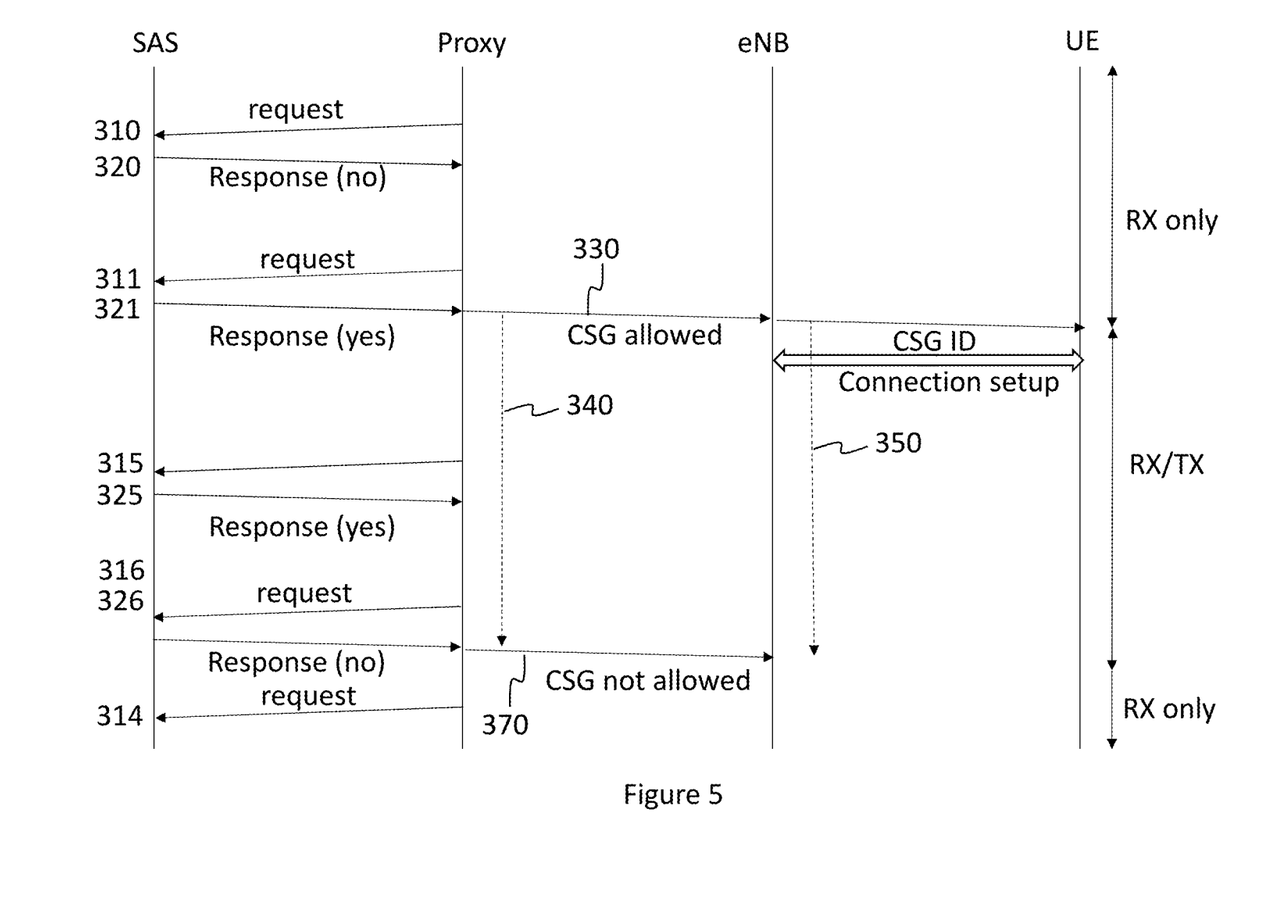
FIG. 5 illustrates a third signaling in accordance with the present invention.

FIG. 5 depicts a further embodiment according to the invention. In this embodiment, instead of forwarding the responses from the SAS to the UE, the domain proxy uses the responses received from the SAS to indicate, periodically as depicted by 340 or otherwise, whether the eNB is allowed to transmit the CSG identifier. The eNB in response transmits the CSG ID periodically from which the UE infers whether it is allowed, which channel to use and which maximum authorized power to apply. For example the channel to use may be inferred from which channel the CSG identifier is received on and the maximum authorized power may be obtained from the stored data set. While authorized, the UE may assume any maximum power value permitted by the eNB to be a value authorized by the SAS, where the domain proxy would update this value to the eNB. When authorization is interrupted, the UE reverts back to the value from the stored data set.

Figure 6:
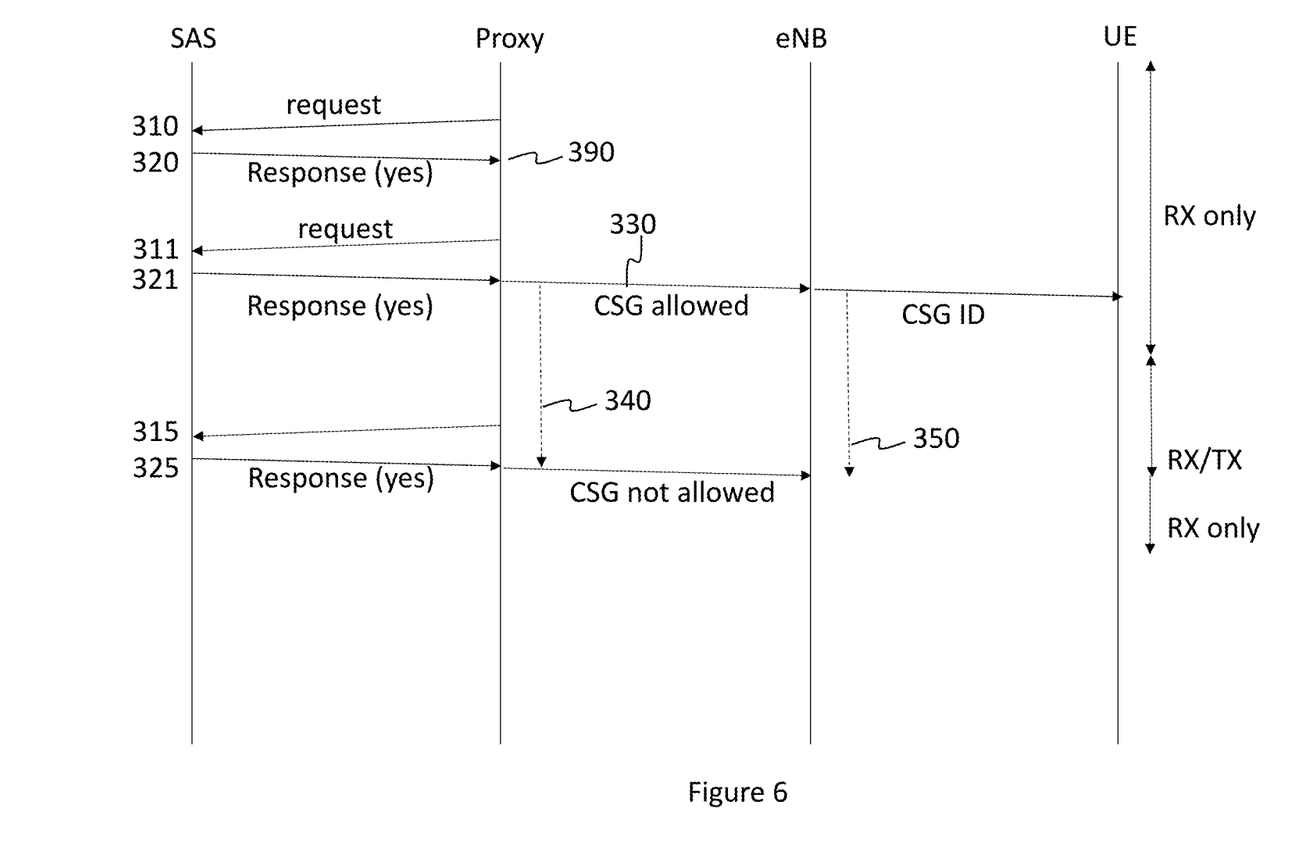
FIG. 6 illustrates a fourth signaling in accordance with the present invention.

FIG. 6 depict another embodiment of the invention. As explained supra, the domain proxy sends periodic requests to the SAS comprising the data set of the UE until it receives a positive authorization response 310. However, instead of indicating in response to the positive authorization response 310 that the eNB may start transmitting the CSG identifier uniquely associated with the UE, the domain proxy first subjects the positive authorization response 310 to at least one criterion. For example, the domain proxy may subject the response 310 to at least one of a channel criterion and a non-zero maximum power value criterion.

Using a channel criterion, the domain proxy may check whether an indication of allowed channels comprised in the response 310 overlaps with at least one channel used by the eNB. When overlap exists, the domain proxy may allow at 330 the eNB to transmit the CSG identifier. If there is no overlap, the domain proxy may at 390 not allow the eNB to transmit the CSG identifier. The domain proxy may indicate in the allowance signal 330 a list of at least one channel the eNB shall limit the transmission of the CSG identifier to. The UE may then from the channel on which the CSG identifier is received infer that it is authorized to use the same channel for transmission or that it is authorized to transmit on a channel configured to be associated with the channel on which the CSG identifier is received. In some embodiments, the at least one channel used by the eNB may be a channel corresponding to an uplink carrier frequency and bandwidth as indicated SIB 2 per 3GPP TS36.331.

Using a non-zero maximum power value criterion, the domain proxy may check whether an indication of maximum authorized power in the response 310 exceeds a threshold associated with the UE. For example, a threshold associated with a minimum power necessary for establishing a link between the UE and the eNB may be stored in the data set for this purpose. In a preferred embodiment, the threshold would have a value between 23 dBm/10 MHz and 47 dBm/10 MHz. When the indication of maximum authorized power in the response 321 exceeds the threshold, the domain proxy allows the eNB to start transmitting the CSG identifier uniquely associated with the UE. When the indication of maximum authorized power in the response 310 does not exceed the threshold, the domain proxy does at 390 not allow the eNB to start transmitting the CSG identifier uniquely associated with the UE. Receiving the CSG identifier then indicates to the UE that the maximum authorized power stored in the data set is authorized.

One skilled in the art will understand that instead or in addition, a UE may be configured with multiple CSG identifiers tied to specific channels, such that the reception of a CSG identifier explicitly indicates the authorized channel. Similarly instead or in addition, a UE may be configured with multiple CSG identifiers tied to a specific maximum authorized power levels, such that the reception of a CSG identifier explicitly indicates the authorized maximum authorized power. The drawback being that for a given CSG identifier length, less UEs can be associated with an eNB. For example, 504 UEs may be associated with an eNB at one identifier per UE. In some embodiments, a longer CSG identifier length may be used for this, or the maximum authorized power and the authorized channel may be signaled separately in a standardized or proprietary extension to the signal, e.g. SIB 4, carrying the CSG identifier.

In certain embodiments according to the invention, the requests to the SAS may identify the eNB the UE is installed to communicate with, communicating with or was last communicating with. Such an indication may facilitate the SAS to consider authorization for the UEs of an eNB as a group. For example, the SAS may consider whether it is feasible to maintain authorization for all UEs of an eNB of a same channel. In another example, the SAS may consider whether it is feasible to maintain authorization for all UEs of an eNB and the eNB of a same channel.

In another example, the SAS may consider that UEs belonging to the same group will not interfere with each other and hence not deny or limit authorization for this reason. The eNB may be identified by its FCC and serial number, but may alternatively be identified by a short identifier, e.g. a CBSD group identifier that is unique for the eNB within the domain proxy, such that the SAS can group UEs by the combination of the corresponding domain proxy and the CBSD group identifier.

In general, requests made by the domain proxy to the SAS are substantially periodic, provided there are no changes to the configuration and data set which the UE may report to the SAS or to the domain proxy. However, the domain proxy may request authorization for a UE at any time. Adventurously, the domain proxy made note a change in authorized channels for a subset of UEs associated with one eNB, or with one CSBD group identifier and request authorization for all remaining UEs associated with the one eNB, or with the one CSBD, regardless of their present authorization not nearing expiration. In this manner, disruption of the eNB uplink caused by a need to change channel may be reduced.

The handover of the control of periodically renewing the authorization from the SAS from the domain proxy to the UE may comprise the identification of the eNB such as the CBSD identifier, an identifier of a prior grant received from the SAS for the UE (for example an initial grant identifier), an interval between requests, a remaining time or expiration time for the current interval and a remaining time or expiration time for the present authorization.

Figure 7:
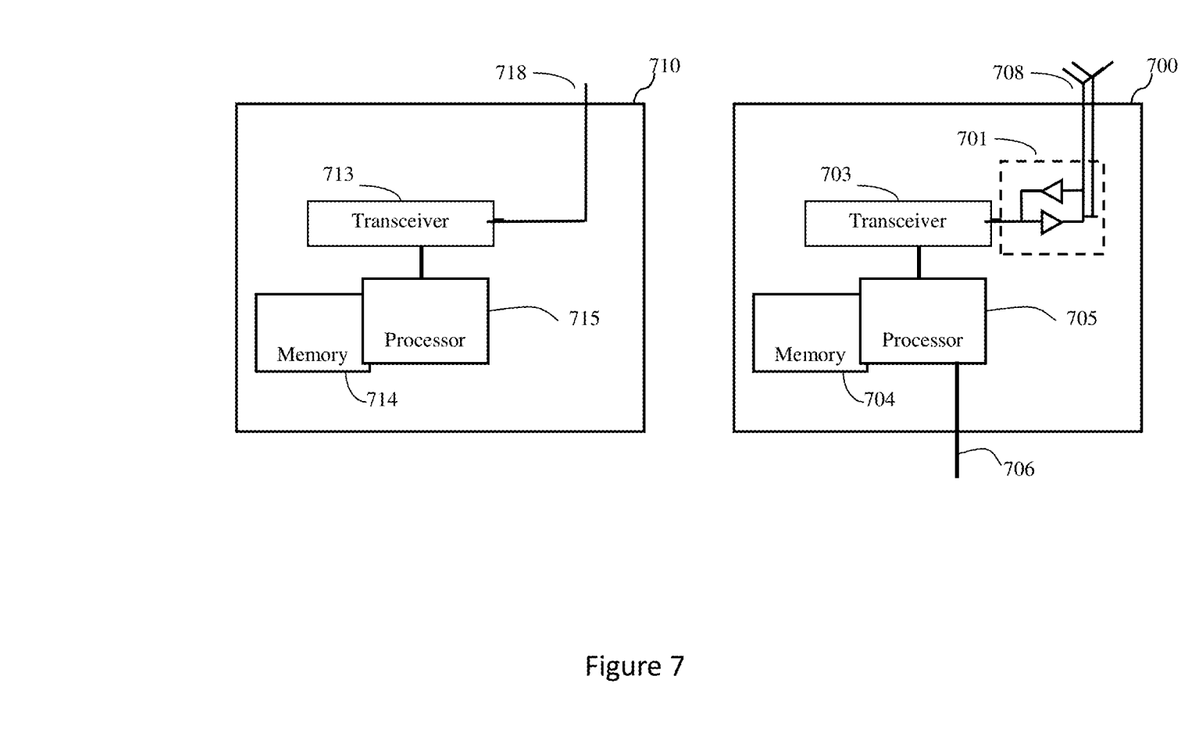
FIG. 7 illustrates example wireless apparatae in accordance with an example embodiment of the invention.

FIG. 7 depicts block diagrams illustrating an example wired (710) and wireless apparatus (700) in accordance with an example embodiment of the invention. The wireless apparatus (700) may include at least one processor (705), at least one memory (504) coupled to the at least one processor (705) and at least one suitable transceiver (703) having a transmitter and a receiver coupled to the at least one processor (705), coupled to at least one antenna unit (508) through at least one amplifier (701). The at least one memory (704) may store computer programs, which may, when executed by the processor (705), for example in combination with any of the at least one transceiver (703), at least one amplifier (701) and at least one antenna unit (708), perform embodiments of the invention. The wireless apparatus may further comprise at least one local access 706, for example a WiFi AP, a Bluetooth transceiver or an Ethernet port, suitable for causing the local access with the at least one processor 705 to store a CSG identifier and/or at least a part of a configuration and installation data set in at least one, preferably non-volatile, memory 704. For example a UE or eNB may be embodied in apparatus 700.

The wired apparatus (710) may include at least one processor (715), at least one memory (714) coupled to the processor (715) and at least one suitable transceiver (713) having a transmitter and a receiver coupled to the processor (715), coupled to at least one wired port (518). The memory (714) may store computer programs, which may, when executed by the processor (715), for example in combination with any of the at least one transceiver (713) and at least one wired port (718), perform embodiments of the invention as described in the present application. A domain proxy or SAS may be embodied in apparatus 710.

Embodiments of the invention may be implemented in software (executed by one or more processors), hardware (e.g., an application specific integrated circuit), or a combination of software and hardware. In an example embodiment, the software (e.g., application logic, an instruction set) is maintained on any one of various conventional non-transitory computer-readable media.

If desired, the different functions discussed herein may be performed in a different order and/or concurrently with each other. Furthermore, if desired, one or more of the above-described functions may be optional or may be combined.

Supra, certain features have been described as generally being performed by a domain proxy. One skilled in the art will appreciate that these features may equivalently be performed by another infrastructure node, or more particularly by the eNB without deviating from the scope or intent of the invention. One skilled in the art will further appreciate that a parameter named other than CSG identifier may be used to perform the functions herein described thereto without departing from the scope of the invention.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
at least one processor; and
at least one memory including computer program code the at least one memory and the computer program code are configured to, with the at least one processor, cause the apparatus to perform at least the following:
send a request to a spectrum access server requesting authorization for a user equipment, not comprised in the apparatus, to transmit on an available spectrum;
receive from the spectrum access server an indication of whether or not the user equipment is authorized to transmit on the available spectrum; and
allow a base station to broadcast a closed subscriber group identifier uniquely associated with the user equipment at least in dependence of the indication,
wherein the closed subscriber group identifier is allowed to be broadcasted when the user equipment is authorized to transmit according to the indication, and wherein the closed subscriber group identifier is not allowed to be broadcasted when the user equipment is not authorized to transmit according to the indication.

2. The apparatus of claim 1, wherein the closed subscriber group identifier is further allowed to be broadcasted in dependence of at least one of:
at least one channel authorized according to the indication; or
a maximum power value authorized according to the indication.

3. The apparatus of claim 2, wherein the closed subscriber group identifier is allowed to be broadcasted when the at least one channel authorized according to the indication comprises a channel used by the base station and wherein the closed subscriber group identifier is not allowed to be broadcasted when the at least one channel authorized according to the indication does not comprise a channel used by the base station.

4. The apparatus of claim 2, wherein the closed subscriber group identifier is allowed to be broadcasted when the maximum power value authorized exceeds a threshold and wherein the closed subscriber group identifier is not allowed to be broadcasted when the maximum power value authorized does not exceed a threshold.

5. The apparatus of claim 1, wherein the request comprises an association of at least one unique identifier of the user equipment with an identifier of the base station.

6. The apparatus of claim 1, wherein the closed subscriber group identifier is uniquely associated with the user equipment at the apparatus prior to any transmission of the user equipment to a network comprising the apparatus.

7. The apparatus of claim 1, wherein the request is sent to the spectrum access server prior to any transmission of the user equipment to a network comprising the apparatus.

8. The apparatus of claim 7, wherein configuration and/or installation data of the user equipment comprised in the request is stored in a memory associated with the apparatus prior to any transmission of the user equipment to a network comprising the apparatus.

9. The apparatus of claim 1, the at least one memory and the computer program code configured to, with the at least one processor, cause the apparatus to further perform the following:
periodically repeat the request while received indications from the spectrum access server indicate that the user equipment is not authorized to transmit and transfer control over periodic repetition of the request to the user equipment when received indications from the spectrum access server indicate that the user equipment is authorized to transmit.

10. The apparatus of claim 1, the at least one memory and the computer program code configured to, with the at least one processor, cause the apparatus to further perform the following:
periodically repeat the request while received indications from the spectrum access server indicate that the user equipment is not authorized to transmit and periodically repeat the request while received indications from the spectrum access server indicate that the user equipment is authorized to transmit and forward received indications from the spectrum access server to the user equipment while the user equipment is authorized to transmit until the user equipment is no longer authorized to transmit.

11. The apparatus of claim 1, the at least one memory and the computer program code configured to, with the at least one processor, cause the apparatus to further perform the following:
periodically repeat the request while received indications from the spectrum access server indicate that the user equipment is not authorized to transmit and periodically repeat the request while received indications from the spectrum access server indicate that the user equipment is authorized to transmit and not forwarding responses from the spectrum access server to the user equipment regardless of whether the user equipment is authorized.

12. A method comprising:
sending a request to a spectrum access server requesting authorization for a user equipment, not comprised in an apparatus performing the method, to transmit on an available spectrum;
receiving from the spectrum access server an indication of whether or not the user equipment is authorized to transmit on the available spectrum; and
allowing a base station to broadcast a closed subscriber group identifier uniquely associated with the user equipment at least in dependence of the indication,
wherein the closed subscriber group identifier is allowed to be broadcasted when the user equipment is authorized to transmit according to the indication, and wherein the closed subscriber group identifier is not allowed to be broadcasted when the user equipment is not authorized to transmit according to the indication.

13. The method of claim 12, wherein the closed subscriber group identifier is further allowed to be broadcasted in dependence of at least one of:
at least one channel authorized according to the indication; and/or
a maximum power value authorized according to the indication.

14. The method of claim 13, wherein the closed subscriber group identifier is allowed to be broadcasted when the at least one channel authorized according to the indication comprises a channel used by the base station and wherein the closed subscriber group identifier is not allowed to be broadcasted when the at least one channel authorized according to the indication does not comprise a channel used by the base station.

15. The method of claim 13, wherein the closed subscriber group identifier is allowed to be broadcasted when the maximum power value authorized exceeds a threshold and wherein the closed subscriber group identifier is not allowed to be broadcasted when the maximum power value authorized does not exceed a threshold.

16. The method of claim 12, wherein the request comprises an association of at least one unique identifier of the user equipment with an identifier of the base station.

17. The method of claim 12, wherein the request is sent to the spectrum access server prior to any transmission of the user equipment to a network comprising the apparatus.

18. The method of claim 12, the at least one memory and the computer program code configured to, with the at least one processor, cause the apparatus to further perform the following:
periodically repeating the request while received indications from the spectrum access server indicate that the user equipment is not authorized to transmit and transferring control over periodic repetition of the request to the user equipment when received indications from the spectrum access server indicate that the user equipment is authorized to transmit.

19. The method of claim 12, the at least one memory and the computer program code configured to, with the at least one processor, cause the apparatus to further perform the following:
periodically repeat the request while received indications from the spectrum access server indicate that the user equipment is not authorized to transmit and periodically repeating the request while received indications from the spectrum access server indicate that the user equipment is authorized to transmit and forwarding received indications from the spectrum access server to the user equipment while the user equipment is authorized to transmit until the user equipment is no longer authorized to transmit.

20. The method of claim 12, further comprising: periodically repeating the request while received indications from the spectrum access server indicate that the user equipment is not authorized to transmit and periodically repeating the request while received indications from the spectrum access server indicate that the user equipment is authorized to transmit and not forwarding responses from the spectrum access server to the user equipment regardless of whether the user equipment is authorized.

21. A computer program product embodied in a non-transitory computer-readable storage medium and encoding instructions that, when executed in hardware, perform a process, the process comprising:
sending a request to a spectrum access server requesting authorization for a user equipment, not comprised in an apparatus performing the method, to transmit on an available spectrum;
receiving from the spectrum access server an indication of whether or not the user equipment is authorized to transmit on the available spectrum; and
allowing a base station to broadcast a closed subscriber group identifier uniquely associated with the user equipment at least in dependence of the indication,
wherein the closed subscriber group identifier is allowed to be broadcasted when the user equipment is authorized to transmit according to the indication, and wherein the closed subscriber group identifier is not allowed to be broadcasted when the user equipment is not authorized to transmit according to the indication.

* * * * *